May 25, 1965      O. A. HALEY      3,185,486

GRANULAR MATERIAL SPREADING MACHINE

Filed Aug. 27, 1962      2 Sheets-Sheet 1

INVENTOR
OLIVER A. HALEY
BY
Talbert Dick & Earley
ATTORNEYS

May 25, 1965     O. A. HALEY     3,185,486
GRANULAR MATERIAL SPREADING MACHINE
Filed Aug. 27, 1962     2 Sheets-Sheet 2
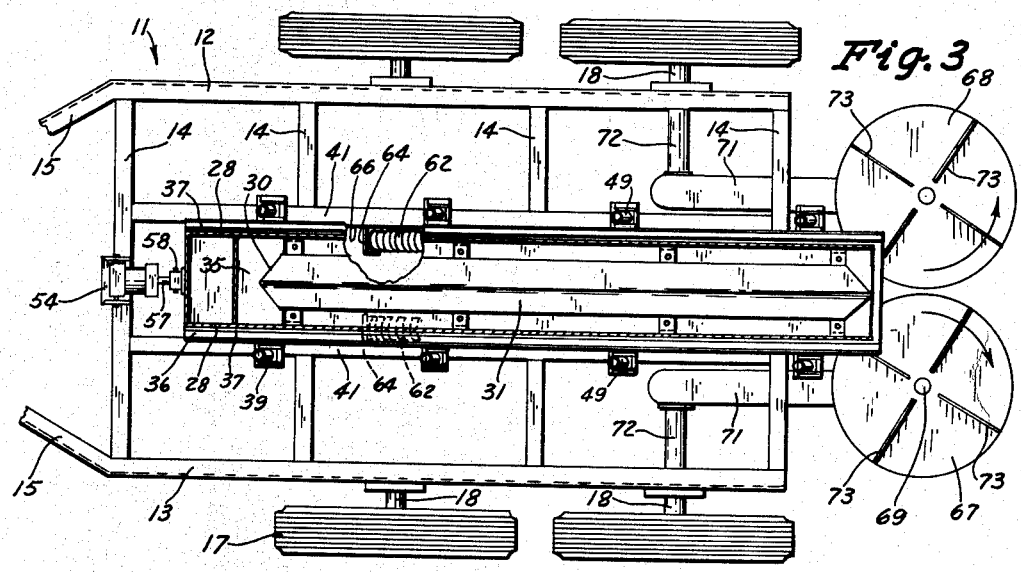
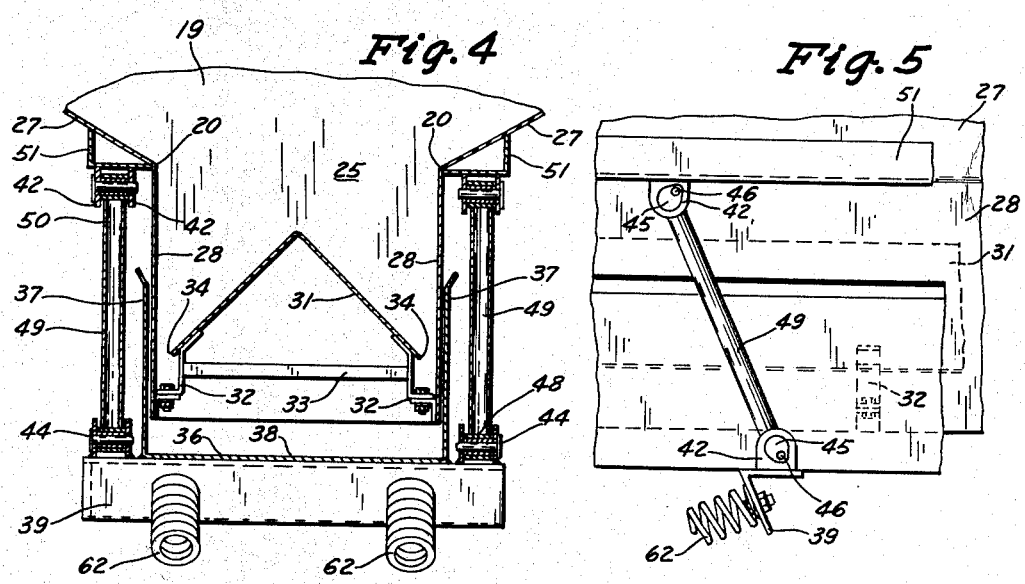
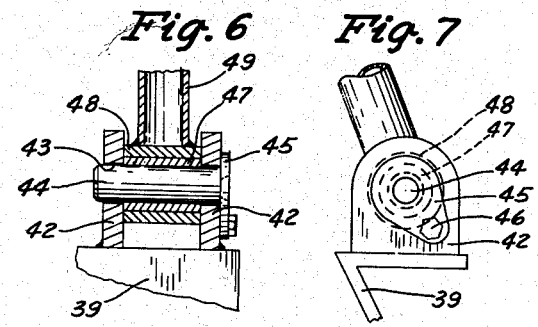
INVENTOR
OLIVER A. HALEY
BY
Talbert Dick & Earley
ATTORNEYS

United States Patent Office 3,185,486
Patented May 25, 1965

3,185,486
GRANULAR MATERIAL SPREADING MACHINE
Oliver A. Haley, 720 14th St. Place, Nevada, Iowa
Filed Aug. 27, 1962, Ser. No. 219,477
3 Claims. (Cl. 275—4)

This invention pertains generally to farm equipment, and more particularly to a machine for spreading granular material.

It is an object of this invention to provide an improved machine for spreading granular material, such as fertilizer.

Another object of this invention is to provide a fertilizer spreading machine with novel mechanism for conveying fertilizer from the storage compartment of the machine to the spreading apparatus at the rear of the machine.

Yet another object of this invention is to provide novel reciprocating mechanism for conveying fertilizer rearwardly in the machine for discharge purposes.

Still another object of this invention is to provide a novel combination of structure for regulating the flow of fertilizer from a storage compartment of a machine to a conveying apparatus and for reciprocating the apparatus to convey the material to the rear of the machine for discharge purposes.

It is another object of this invention to provide a fertilizer spreading machine capable of attaining the above designated objective which is economical to manufacture, simple in construction, and effective in operation.

These objects and other features and advantages of this invention will become readily apparent upon reference to the following description, when taken in conjunction with the accompanying drawings, wherein:

FIG. 3 is a fragmentary sectional view taken along the line 3—3 in FIG. 2, with certain parts broken away for illustrative clarity;

FIG. 4 is an enlarged sectional view taken along the line 4—4 in FIG. 2;

FIG. 5 is an enlarged, fragmentary, side elevational view of a detail of the machine of FIG. 2;

FIG. 6 is an enlarged fragmentary sectional view of a detail of FIG. 4; and

FIG. 7 is a side elevational view of the detail structure of FIG. 6.

Figure 1:
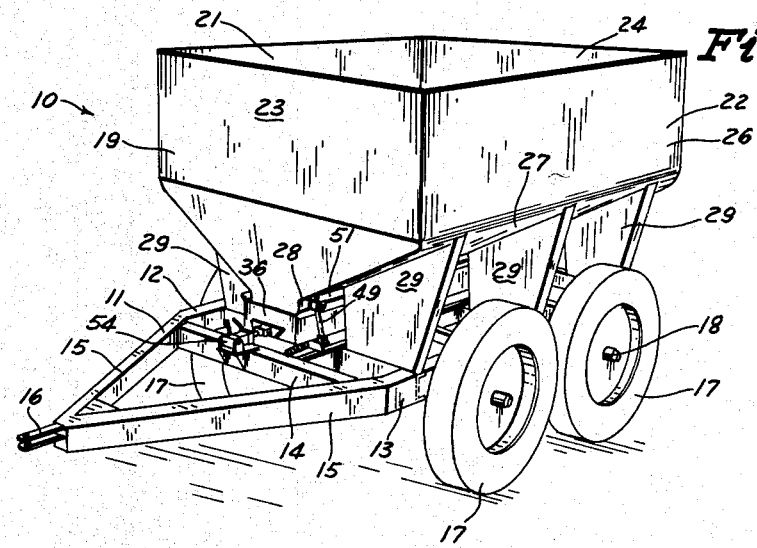
FIG. 1 is a perspective view of one embodiment of the fertilizer spreading machine of this invention.

Referring now to the drawings, the fertilizer spreading machine of my invention is disclosed generally at 10 in FIG. 1, and comprises an A-frame 11 including a pair of longitudinally extended, transversely spaced side beams 12 and 13. A plurality of transverse cross members 14 are secured to and extended between the side beams, the frame 11 being completed by a pair of converging front beams 15. A hitch connection 16 (FIG. 1) is secured at the front connection of the beams 15.

The frame 11 is portable by being mounted on a quartette of wheels 17, the axles 18 of which are journaled in the sides of the frame 11 (FIG. 3). A storage bin 19 (FIG. 1) is mounted over the frame 11, and comprises a pair of transversely spaced side walls 21 and 22, a front wall 23, and a rear wall 24. Each side wall 21 and 22 includes a straight upper portion 26 (FIG. 1), an intermediate portion 27 (FIGS 1 and 4) slanted downwardly and inwardly relative to the upper portion 26, and a straight lower portion 28 (FIG. 4) depending from the inner lower edge 20 of the intermediate portion 27. The lower portions 28 form a discharge opening or throat 25 for the bin 19 as best illustrated in FIG. 4. The lower areas of the front wall 23 and the rear wall 24 are shaped to fit the contour of the side walls 21 and 22.

The storage bin 19 is supported above the frame 11 by a plurality of vertically disposed support weldments 29 the upper ends of which are shaped to fit against the slanted intermediate portions 27 of the side walls 21 and 22, and the lower portions of which are adapted to be secured to the transverse cross members 14 and the side beams 12 and 13 (FIG. 1). Referring to FIGS. 3 and 4, it is seen that an elongated V-shaped baffle plate 31 is supported in an inverted manner within the bin throat 25 and between the side wall lower portions 28, by a plurality of bracket units 32 and tie bars 33.

It is noted in FIG. 4 that the lower edges 34 of the baffle plate 31 are spaced equally from the depending side portions 28, providing thereby a means of regulating the flow of material downwardly through the throat 25. To direct the material in the front of the storage bin 19 downwardly and adjacent the front end 30 (FIG. 3) of the baffle plate 31, a downwardly and rearwardly disposed panel 35 is secured between the side walls and depends slightly in front of and below the plate front end 30. A plurality of U-shaped stiffeners 40 (FIG. 2) are secured to the outer sides of the lower portions 28 for stiffening the throat section of the bin 19.

An elongated U-shaped pan 36 (FIG. 4) having vertically disposed, transversely spaced walls 37 interconnected by a straight, flat bottom wall 38 is secured to a plurality of longitudinally spaced, transversely extended angle irons 39, all of which are extended laterally of and normally spaced above a pair of elongated, longitudinally extended, center frame beams 41 best shown in FIG. 3. The width between the walls 37 of the pan 36 (see FIG. 4) is slightly greater than the width between the lower portions 28 of the bin side walls 21 and 22, such that the throat 25 of the storage bin 19 depends into the U-shaped pan 36, as best illustrated in FIG. 4.

At the laterally exposed end of each angle iron 39, a pair of transversely spaced, upstanding ears 42 (FIGS. 4-7) are mounted, and which are provided with axially aligned, horizontal openings 43 for receiving a hinge pin 44. The head 45 of the hinge pin 44 is secured to the exterior side of the outer ear 42 (FIG. 7) by a bolt 46, and a bushing 47 embraces the hinge pin 44 between the ears. Movably encircling the bushing 47 is the lower end 48 of a connecting rod 49, with the upper end 50 (FIG. 4) of the rod 49 assembled in structure identical with that described for the lower end 48. The upper ears 42 are secured to an elongated, L-shaped connecting rod hanger 51, which is secured to the lower edge of each slanted intermediate side wall portion 27.

To reciprocate the pan 36 relative to the bin 19 and particularly to the baffle plate 31, a double-acting hydraulic piston and cylinder unit 54 (FIGS. 1 and 2) is provided. The forward cylinder end of the unit 54 is pivotally mounted on a pedestal 56 secured to a forward cross member 14, and the outer end of the piston 57 of the unit 54 is pivotally connected to a stub shaft 58 secured to the front of the pan 36. Hydraulic lines 61 are connected to both ends of the hydraulic piston and cylinder unit 54, for supplying fluid thereto from the hydraulic system of a prime mover (not shown). The normal position of the pan 36 is best illustrated in FIG. 2 with the piston 57 extended and wherein the pan 36 and the connecting rods 49, shown in full lines, are positioned slightly upwardly and to the rear of a straight depending position of the rods 49.

Figure 2:
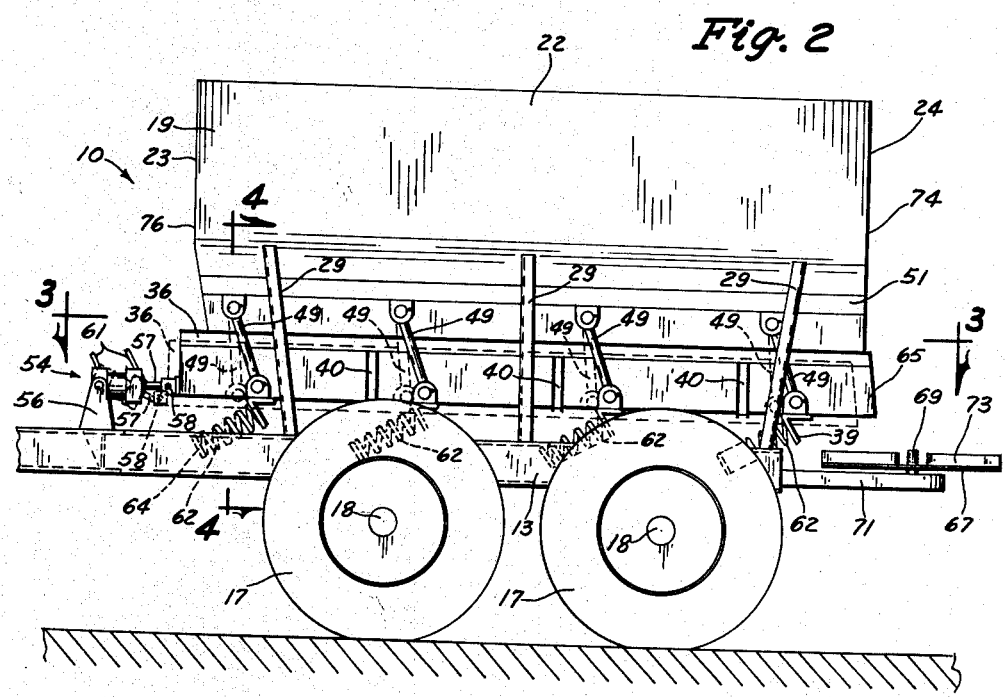
FIG. 2 is a fragmentary, side elevational view of the machine of FIG. 1, certain parts thereof being shown in dotted lines for clarity of illustration, and other parts shown in alternate positions by the use of full and dotted lines.

When the piston and cylinder unit 54 is operated to withdraw the piston 57 within the unit 54, the pan 36 is swung, along with its connecting rods 49, downwardly and forwardly to the dotted line position as shown in FIG. 2. This forward movement of the pan 36 from the full to the dotted line positions of FIG. 2 is resisted by a plurality of transversely spaced pairs of coil springs 62 (FIGS. 2 and 4), the upper ends of which are secured to the angle irons 39 as best illustrated in FIGS. 4 and 5. The lower ends of the springs 62 are each adapted to engage a bracket 64 secured to the inner side 66 (FIG. 3) of one of the center beams 41. It will readily be appreciated that after the inward stroke by the piston 57 (FIG. 2), upon operation of the unit 54 to extend the piston 57, the outward movement thereof to force the pan 36 upwardly and rearwardly of the machine is aided by the expansion of the springs 62.

As the fertilizer is moved rearwardly of the storage bin 19 by the reciprocating movement of the pan 36, the fertilizer is discharged out the open rear end 65 (FIG. 2) of the pan 36, and falls by gravity onto a pair of transversely spaced circular spreading members 67 and 68 (FIGS. 2 and 3). The members 67 and 68 are rotatably supported on upright pivot shafts 69 mounted on the outer ends of rearwardly extended supports 71 which house driving means connected to auxiliary rear axles 72 (FIG. 3) drivingly connected to the wheel axles 18. Each spreading member 67 and 68 is provided with radially extended upright vanes 73 which are adapted upon rotation of the members to throw the fertilizer to the rear and to the sides of the machine, according to the rotation of the members 67 and 68, as indicated by the arrows in FIG. 3.

In the operation of the machine 10, granular material such as fertilizer is discharged into the bin 19, falling downwardly through the throat 25 (FIG. 4) where it strikes the baffle plate 31. The fertilizer then falls down the sides of the baffle plate 31 and is discharged in regulated quantities between the edges 34 thereof and the side wall portions 28 onto the pan 36. Upon movement of the machine 10, it will readily be appreciated that the spreading members 67 and 68 (FIG. 3) are rotated for the purpose described hereinbefore.

Thus, upon operation of the piston and cylinder unit 54 to effect a reciprocating movement of the piston 57, a resulting longitudinal reciprocation of the pan 36 results due to a swinging of the suspended connecting rods 49 forwardly and rearwardly as best illustrated in FIG. 2. As mentioned hereinbefore, the rearward movement of the pan 36 toward the rear 74 of the machine is upwardly, whereas the forward movement thereof toward the front 76 of the machine is downwardly. It can readily be appreciated, therefore, that the fertilizer is sequentially jogged rearwardly along the bottom wall 38 of the pan 36 toward the open rear end 65 (FIG. 2) thereof.

Also, as mentioned hereinbefore, the forward movement of the pan 36 is resisted by the compression of the springs 62. Conversely, upon rearward movement of the pan 36 due to the action of the hydraulic unit 54, the expansion of the springs 62 actually aids this movement. Thus, the forward movement of the pan 36 is slow, as compared to the considerably quicker rearward movement. It may therefore be appreciated that the granular material on the pan 36 will be moved rearwardly of the machine 10 for discharge onto the spreading members 67 and 68 due to the reciprocation of the pan 36. The granular material is then thrown rearwardly and laterally of the machine 10 as described hereinbefore.

In summation, a machine for spreading fertilizer and like granular material has been disclosed, and described herein, and which features the regulated discharge of the granular material to the rear and sides of the machine by the utilization, among other structures, of reciprocating apparatus suspended from the storage compartment of the machine.

Some changes may be made in the construction and arrangement of my granular material spreading machine, without departing from the real spirit and purpose of my invention, and it is my intention to cover by my claims, any modified forms of structure or use of mechanical equivalents which may be reasonably included within their scope.

I claim:
1. A granular material spreading machine, comprising in combination,
   a wheeled frame adapted to be pulled by a prime mover,
   a granular material storage bin mounted on said frame and having an elongated longitudinally extended opening formed therein for discharging the material downwardly from the bin,
   a U-shaped pan having open ends and side walls disposed on either side of said bin and having a bottom wall disposed below and extended the length of said opening,
   a plurality of connecting rods pivotally connected to said bin at their upper ends and swingably suspended therefrom, the lower ends of the connecting rods pivotally connected to said pan,
   resilient means secured to said pan and adapted to bias said pan toward a raised position disposed toward one end of said machine,
   and reciprocable means pivotally connected to said pan and operable at times to move said pan in a downward direction thereby compressing said resilient means and to move said pan in an upward direction; said downward movement of said pan being retarded by said resilient means, said upward movement of said pan being accelerated by the expansion of said resilient means to discharge said material from said pan,
   said material being discharged from said pan into a material spreading means on said fame.

2. A granular material spreading machine, comprising in combination,
   a wheeled frame adapted to be pulled by a prime mover,
   a granular material storage bin mounted on said frame and having an elongated longitudinally extended opening formed therein for discharging the material downwardly from the bin,
   a U-shaped pan having open ends and side walls disposed on either side of said bin and having a bottom wall disposed below and extended the length of said opening,
   a plurality of connecting rods pivotally connected to said bin at their upper ends and swingably suspended therefrom, the lower ends of the connecting rods pivotally connected to said pan,
   resilient means secured to said pan and adapted to bias said pan toward a raised position disposed toward one end of said machine,
   hydraulic power means pivotally connected to said pan which is operated by said prime mover, said hydraulic power means operable to reciprocatably move said pan in a downward direction thereby compressing said resilient means and to move said pan in an upward direction, said downward movement of said pan being retarded by said resilient means, said upward movement of said pan being accelerated by the expansion of said resilient means to discharge said material from said pan,
   said material being discharged from said pan into a material spreading means on said frame.

3. A granular material spreading machine, comprising in combination,
   a wheeled frame adapted to be pulled by a prime mover,
   a granular material storage bin mounted on said frame and having an elongated longitudinally extended opening formed therein for discharging the material downwardly from the bin,
   an inverted U-shaped plate secured to said bin within said opening and extending the length thereof for regulating the flow of the grain through the opening,
   a U-shaped pan having open ends and side walls disposed on either side of said bin and having a bottom wall disposed below and extended the length of said opening, a plurality of connecting rods pivotally connected to said bin at their upper ends and swingably suspended therefrom, the lower ends of the connecting rods pivotally connected to said pan, resilient means secured to said pan and adapted to bias said pan toward a raised position disposed toward one end of said machine, hydraulic power means pivotally connected to said pan which is operated by said prime mover, said hydraulic power means operable to reciprocatably move said pan in a downward direction thereby compressing said resilient means and to move said pan in an upward direction, said downward movement of said pan being retarded by said resilient means, said upward movement of said pan being accelerated by the expansion of said resilient means to discharge said material from said pan, said material being discharged from said pan into a material spreading means on said frame.

References Cited by the Examiner

UNITED STATES PATENTS

| | | |
|---|---|---|
| 934,317 | 9/09 | Jones. |
| 2,564,494 | 8/51 | Morrison _____ 275—8 |
| 2,696,905 | 12/54 | Rigali _____ 198—56 |
| 2,830,696 | 4/58 | Musschoot _____ 198—220 |
| 2,863,578 | 12/58 | Gaddis _____ 214—83.3 |
| 3,097,734 | 7/63 | Erickson _____ 198—53 |

FOREIGN PATENTS

| | | |
|---|---|---|
| 413,272 | 5/10 | France. |
| 737,174 | 9/55 | Great Britain. |

HUGO O. SCHULZ, *Primary Examiner*.